Patented May 4, 1937

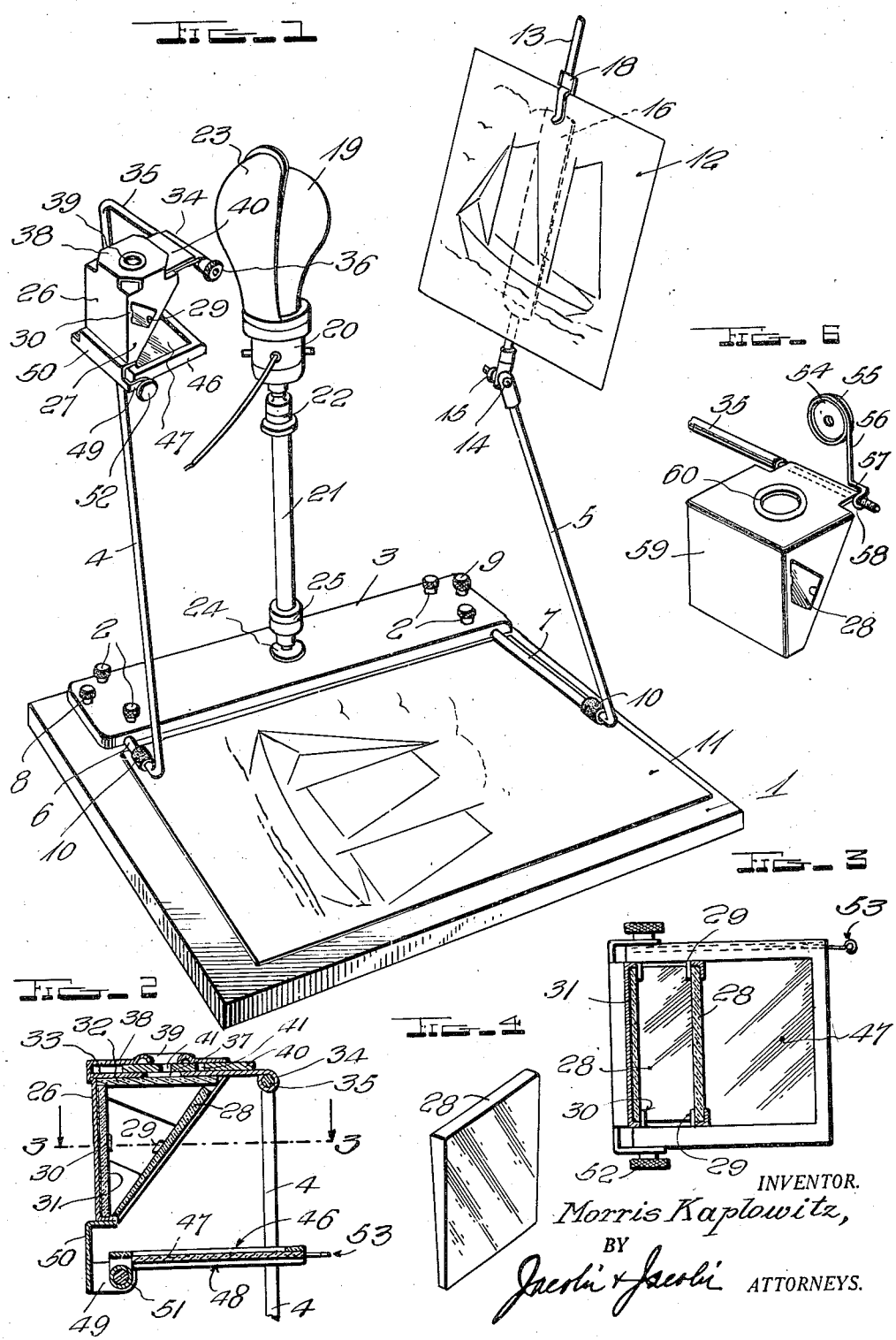

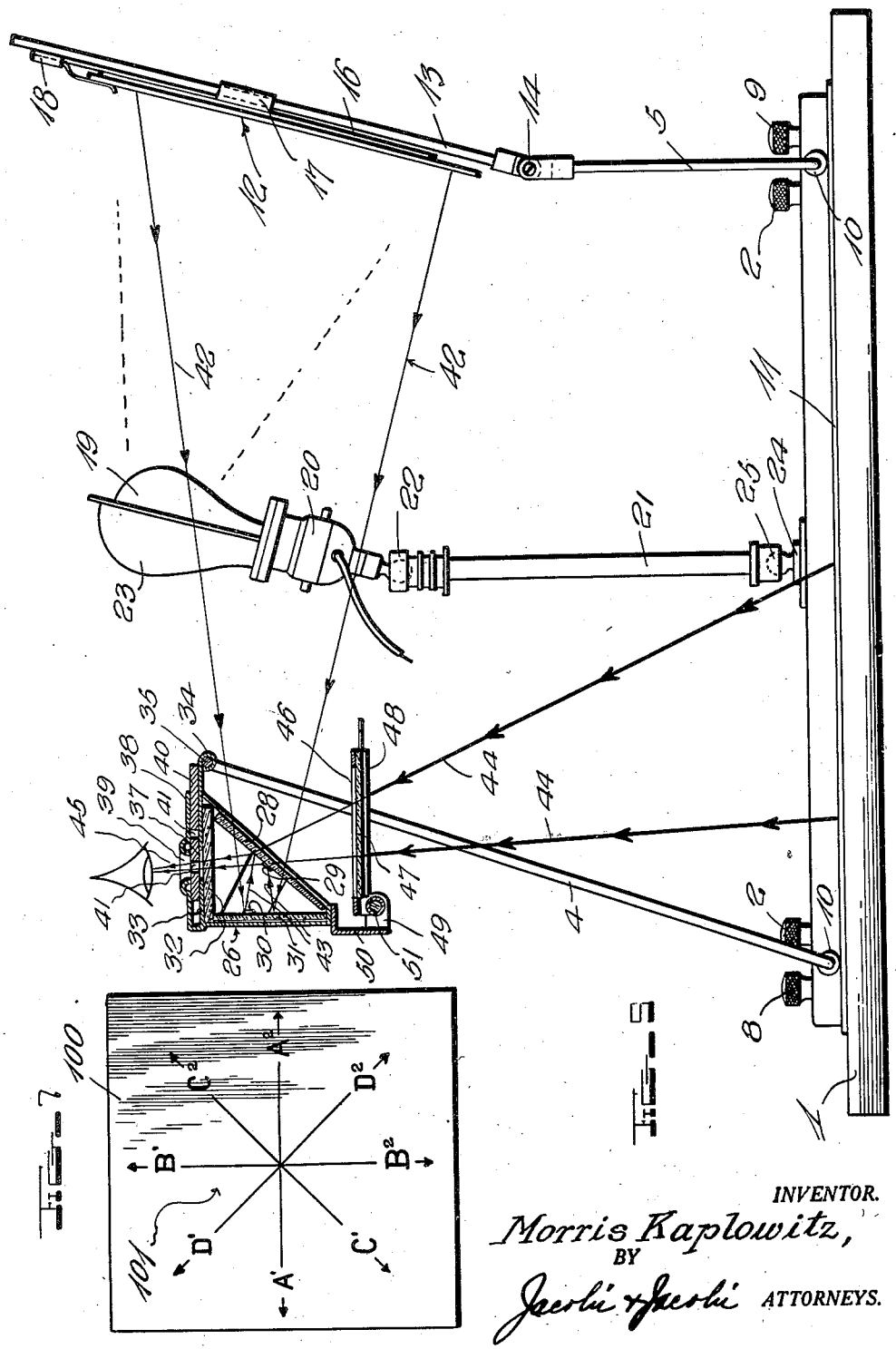

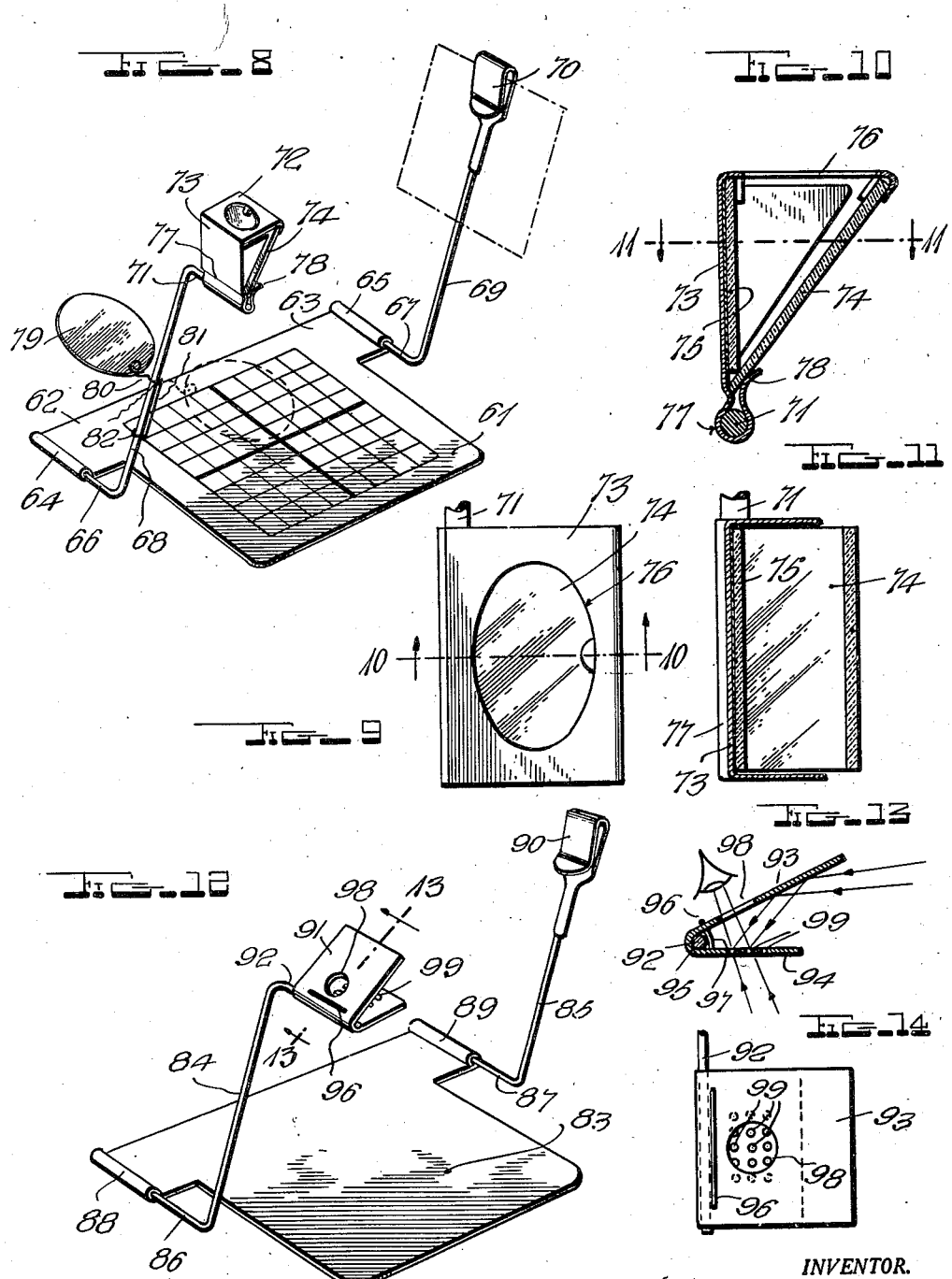

2,079,508

UNITED STATES PATENT OFFICE 2,079,508

OPTICAL REPRODUCING DEVICE

Morris Kaplowitz, Brooklyn, N. Y., assignor to Microphone Corporation of America, Brooklyn, N. Y.

Application September 1, 1934, Serial No. 742,499

19 Claims. (Cl. 88—75)

This invention relates to an optical reproducing device having as one of its elements an instrument of the type known in the art as a camera lucida and one object of the invention is to provide a device by use of which a picture or other object may be accurately reproduced upon a delineating surface by a person using a pencil, tool, marking implement or other recording method, the device being so constructed that when the picture or article to be reproduced is viewed through the same an optical illusion will cause it to seem to appear upon the delineating surface upon which it is to be reproduced, and thereby accurately copied by a tracing operation.

Another object of the invention is to so construct the improved device that the reproduction copied by the operator of the device will be either the same size as the original or reproduced upon an enlarged or reduced scale.

Another object of the invention is to provide means for illuminating the object while being reproduced if a good natural light is not available and to also provide means for absorbing glaring light reflected from the surface upon which the copy is to be made to prevent this reflected light from interfering with the apparent reflection of the object upon the delineating surface.

Still another object of the invention is to provide the device with a phantom image reflecting plate of such construction that there is no double reflection of the object when the device is in use. The apparent reflection upon the delineating surface will consist of single lines instead of double lines and thereby permit an accurate reproduction of the object to be made.

A still further object of the invention is to so construct the device that its elements may be adjusted to prevent angular and linear distortion and thereby cause a very accurate reproduction to be made.

Another object of the invention is to so construct the device that when it is in use and a flat sheet of material is used as a delineating surface a portion of the device may serve as means for holding this sheet against shifting out of its proper position.

A still further object of the invention is to provide a means so that although the optical element has a wide angle view and a full image is seen the apparent reflection on the delineating surface will not shift as the head or the eye of the observer is moved. This makes possible fine and accurate work.

Still another object of the invention is to provide a device of this character which is simple in construction, cheap to manufacture and so constructed that when not in use it may be folded into a compact mass and stored in a small space.

The invention is illustrated in the accompanying drawings wherein:

Figure 1 is a perspective view of a preferred form of the invention;

Figure 2 is an enlarged sectional view taken through the observation element of the device;

Figure 3 is a sectional view taken horizontally along the line 3—3 of Figure 2;

Figure 4 is a perspective view, somewhat exaggerated, of a phantom image reflecting plate forming an element of the observation element;

Figure 5 is a view showing the improved device partially in side elevation and partially in vertical section;

Figure 6 is a perspective view of a modified form of observation element;

Figure 7 is a view of a card used when initially setting the object holder in order to prevent distortion when making a copy;

Figure 8 is a perspective view of a modified embodiment of the invention;

Figure 9 is a top plan view of the observation element shown in Figure 8;

Figure 10 is an enlarged vertical sectional view of the observation element of Figure 8, the view being taken along the line 10—10 of Figure 9;

Figure 11 is a horizontal sectional view taken along the line 11—11 of Figure 10;

Figure 12 is a perspective view of another embodiment of the invention;

Figure 13 is a sectional view taken along the line 13—13 of Figure 12; and

Figure 14 is a top plan view of the observation element shown in Figure 12.

The apparatus constituting the subject matter of this invention is for use when copying a picture or making an original reproduction of an animate or inanimate object and may be constructed for use either with or without a drawing board although it will be obvious that a suitable support that will serve as a solid foundation for the apparatus and the delineating surface must be provided. This particularly applies to the apparatus illustrated in Figures 1 and 5 but not necessarily to those illustrated in Figs. 8 and 12.

The drawing board 1 shown in Figures 1 and 5 is of the usual construction and in these figures, the apparatus has been shown secured in a stationary position upon the board by screws 8 and 9 which pass through the base 3 and firmly but detachably secure the base in a set position thereon. Upright rods 4 and 5 are disposed at opposite ends of the base and at their lower ends are formed with side arms 6 and 7 which are rotatably engaged through the base, thereby mounting the rods for swinging movement longitudinally of the base, and set screws 2 are carried by the base which when tightened will engage the side arms and firmly but releasably hold the rods in angularly adjusted positions. By this arrangement, the two rods can be secured in proper angular relation to each other when the device is in use and by loosening the set screws the rods may be swung downwardly upon the upper face of the board and thereby reduce the apparatus to a compact mass which may be stored in a flat box. It should also be noted that the side arms 6 and 7 carry rubber rollers or sleeves 10 which rest upon the upper face of the board 1 and will serve to engage upper and lower ends of a sheet of material 11 serving as the delineating surface and firmly hold the sheet in place upon the board. If the base is set upon a table instead of being secured to a board, the rollers will act in the same manner to hold the sheet or other delineating surface in place upon the table and prevent it from slipping while a reproduction is being made.

The picture 12 which is to be copied is to be supported in front of a person as shown in Figure 1 and in order to support this picture there has been provided an upper rod 13 having its lower end swivelled to the upper end of the rod 5 as shown at 14 and it will be apparent that by loosening the nut 15 the rod 13 may be swung to angularly adjusted positions where it will be firmly held when the nut is again tightened. A plate 16 serving as a backing for the picture is connected with the rod 13 by a sleeve 17 which fits snugly upon this rod and has frictional engagement therewith in order that the plate may be slid vertically upon the rod or turned about the same to dispose the picture in a desired position. A clip 18 is provided to engage the upper portion of the picture and firmly hold the picture in place against the front face of the plate 16. It will thus be seen that the picture can be easily slid into place between the clip and plate and the plate then slid vertically along the rod to dispose the picture at the proper elevation and also that the plate may be swung around the rod to prevent distortion.

When this device is in use, light should strike the picture from over the shoulder of the operator but this can not always take place and also it is often desired to use the apparatus in a room where artificial light must be depended upon. Therefore, I have provided illuminating means consisting of a bulb 19 carried by a socket 20 at the upper end of a tube or standard 21, the socket being connected with the standard by a universal joint 22 in order that the socket may be tilted or turned to a position in which the reflector 23 will direct light from the bulb upon the picture from such a direction that the picture will be well illuminated. The lower end of the standard is connected with a mounting 24 by a universal joint 25 in order that the standard may be adjusted toward or away from the picture and also transversely thereof and thereby insure proper illumination of the picture without the light interfering with the operator clearly seeing the picture.

The observation element or camera lucida illustrated in Figures 1 through 5 consists of a sheet metal casing 26 which is open at its front and has triangular side walls 27 carrying inturned flanges along their front edges against which rest side edge portions of a transparent glass plate 28 (or other transparent or semi-transparent reflecting material) which will be referred to as a phantom reflector. This phantom reflector is held against the flanges by tongues 29 projecting inwardly from the side walls and similar tongues 30 are provided to hold a mirror 31 firmly against the rear wall of the casing. Referring to Figures 2 and 5, it will be seen that a plate 32 of transparent glass is engaged by upper ends of the mirror and phantom reflector and held firmly against the upper wall of the casing. This upper wall 33 projects forwardly from the side walls and has its forward end portion rolled to form a sleeve 34 through which is engaged an arm 35 formed by bending the upper portion of the rod 4 in an opposite direction to that in which the arm 6 extends. The end portion of the arm 35 about which the sleeve fits is of reduced diameter and threaded and therefore when the nut 36 is tightened the sleeve will be frictionally held against turning about the arm and the observation element held in an angularly adjusted position and the observation element can be so adjusted that when the operator looks through the sight opening 37 formed in the upper wall 33 a reflection of the picture will appear in a desired position upon the sheet. A hood 38 overhangs the upper wall and is formed with a sight opening 39 aligned with the sight opening 37 and by looking through these openings, the operator can make preliminary adjustments and also determine whether there is a tendency for the image to shift as his head or the eye is moved. If it is found that the image shifts as the head or eye is moved a precision plate 40 formed of opaque material is slid into place between the hood and upper wall of the casing and moved longitudinally until a selected one of the openings 41 is disposed between the openings 37 and 39. One of these openings 41 is smaller than the other. The smaller the eye opening the more steady the image will appear. This is due to the fact that the small eye opening keeps the angle of vision constant to a given point on the delineating surface through the openings 37 and 38 even though the head or the eye of the operator is moved. An important reason for using a variable eye opening is that in making enlargements it is necessary to confine the angle of vision to closer limits than in making reductions. In making a very accurate copy easily it is important for the image to appear absolutely steady.

When this device is in use the drawing board is set upon a table or other convenient support in front of the operator and the light turned on and adjusted so that the picture held by the clip will be well illuminated. The operator then slides a sheet of paper into place upon the board in such position that its upper and lower portions will be engaged under the rollers 10 or the operator may fasten to the board the object or material which is to serve as the delineating surface by other means or may remove the apparatus from the board and place or fasten the apparatus directly on the object or material which is to serve as the delineating surface. This device is not limited to paper as the delineating surface for making reproductions but may use as a delineating surface metal, glass, wood, leather, and other hard or soft materials, nor is it limited to a flat even delineating surface but may be used to apply reproductions on irregularly shaped objects. With the picture and sheet of paper in place, the operator then looks through the sight opening 39 of the observation element and by tilting the rods and adjusting the picture carrying plate can properly center a reflection of the picture upon the sheet of paper. Swinging the observation element about the arm 35 also has an important result as the mirror 31 must be in proper angular relation to the picture to reproduce a good reflection and cause the reflection to be properly located upon the paper.

Referring now to Figure 5; it will be seen that when the apparatus is properly set with the picture well lighted by the lamp 19 or by light striking the picture from a window at the back and somewhat to one side of the operator, the picture will be reflected into the mirror 31 and from this mirror will be directed onto the phantom reflector 28 as indicated by the lines 42 and 43. The operator's line of vision is indicated by the lines 44 and 45 and it will be observed that these lines intersect the lines 43 at the phantom reflector. Attention is now called to the fact that since the sheet of paper is viewed through the phantom reflector and the reflection of the picture is directed upon this reflector the operator will see both the paper and the reflection of picture and it will appear that the reflection is upon the paper instead of merely upon the phantom reflector. A pencil or other marking implement held in the operator's hand can also be clearly seen and therefore the operator can follow the lines of the reflection which appear to be upon the paper instead of upon the reflector 28 and make an exact reproduction of the picture. In using this apparatus to lay out reproductions for other arts and crafts, such as, etching, engraving, carving, stencil making, photographic retouching, etc., the various implements and processes used in these arts and crafts can be applied by the operator directly on the delineating surface by tracing the apparent reflection with the usual means. Instead of a picture, an inanimate object may be suspended in front of the plate 16 or a person may sit at the other side of the table from the operator in such a position that a reflection of the posed person will appear in the mirror 31 and directed upon the phantom reflector. When used for portrait work, copying large pictures, or other animate or inanimate objects that are too large or cannot be placed in front of the picture holder, the plate 16 and the slide rod 13 are removed at 14 and the rod 5 is folded down in a horizontal position away from the operator to allow a clear and unobstructed view of the object. This apparatus has a wide field of applications in making reproductions upon regular or irregular surfaces on hard or soft materials by a process of delineation in which the operator traces the apparent reflection seen with the eye by the aid of a delineating means controlled by the hand. Due to the fact that this apparatus is a device in which the coordination of the eye and hand is the paramount factor it can also be employed for exercises in which the coordination between the eye and hand is desired.

Referring particularly to Figures 2, 4, 5, and 10, it will be seen that the plate of glass constituting the phantom reflector is not of the same thickness throughout its area but is gradually reduced in thickness from its upper edge to its lower edge. This taper has been exaggerated in the drawings in order to emphasize the same, as in actual construction a glass plate used as a phantom reflector and being 1 inch square will have a thickness of .0515" at its upper edge and at its lower edge a thickness of .051". This is just an example. The variation in thickness between the upper edge and the lower edge of the plate depends on the grade and inherent quality of the glass or other reflecting material and the size and thickness of the same. This taper has an important function as when light rays pass through glass set at an angle they are bent somewhat and if a sheet of glass of even thickness were used, the reflection which the operator apparently sees upon the sheet of paper would have double lines instead of single lines and an accurate copy could not be reproduced whereas when a tapered glass is used a single line reflection will be seen and no mistakes will be made. It is also important that the glass be set in place with its thicker edge uppermost as otherwise double lines will be seen.

When using the apparatus, it will often be found that due to the presence of too much light being reflected from the delineating surface through the phantom reflector the reflected image will be of such low intensity that the lines of the object reflected into this reflector can not be clearly seen and at times will be almost invisible. This is due mainly to the fact that the light is coming from the wrong direction so that there is more light reflected from the delineating surface into the optical element than there is reflected from the object to be reproduced. Therefore, there has been provided an absorption screen 46 consisting of a sheet of semi-transparent material 47 which is preferably colored or tinted glass or celluloid but may be any suitable material and is colored red or any other selected color sufficiently dark to deaden the glare from the delineating surface without preventing a person from seeing through the screen. This sheet of colored material is mounted in a frame 48 which is pivoted at one end to ears 49 projecting from a depending bracket 50 carried by the casing 26 and the pin or rod 51 about which the frame turns is carried by a knurled headed screw 52 which when tightened will hold the screen in an operative position as shown in Figures 1 and 5. It will also be noted that when the retaining spring 53 is pressed outwards the absorption screen 47 can be removed by sliding forward and a screen of another color or degree of transparency may be substituted. The transparency may be varied by using denser screens or several screens may be used at one time to decrease the degree of transparency and thereby obtain th best balance between the light coming from the object and the light coming from the delineating surface. With the light properly balanced, the image can be traced with accuracy and ease due to the fact that the image, the delineating implement, and the delineation already completed can be seen very clearly. When the screen is in this operative position, light reflected upwardly from the paper as indicated by the lines 44 passes through the screen and then through the phantom reflector and up through the sight openings to the eye of the operator as indicated by the lines 45 and reduction in the intensity of the light reflected from the paper is indicated by having the portions of the lines 44 below the screen appreciably darker than the lines above the screen. It is important that the screen be located below the casing 26 where it will be out of the path of light passing from the picture to the mirror 31 as otherwise a good reflection of the picture will not be obtained. When the light is such that the absorption screen is not necessary, the screw 52 will be loosened sufficiently to permit the screen to be swung to an inoperative position or the screw can be only tightened to such an extent that the frame 48 can be swung without loosening the screw and be frictionally held in an adjusted position. When used without the absorption screen, it is desirable to stain the drawing board 1, Figures 1 and 5, with a dark stain or to provide a sheet of black material which may be referred to as a focusing sheet as a dark surface will show a bright image without a return glare which causes interference with the image. This is useful when making adjustments or also for demonstrating purposes. In the apparatus illustrated in Figures 8 and 12 the bases 61 and 83 should be finished in dark colors which will also serve the same purpose.

Ordinarily, a picture is engaged in the clip and the rods and observation element adjusted to center the reflection upon a sheet of paper or other delineating surface, and it will be appreciated that by properly adjusting the parts the reflection may be of the same dimensions as the original picture or object or an enlargement or reduction thereof produced. When, however, a very accurate reproduction is to be made and it is desired to prevent distortion the card 100 shown in Figure 7 is engaged with the clip 18 before the picture is set in place or a shell or other inanimate object suspended from the clip. This card which may be referred to as a chart has lines thereon radiating from a common center as shown at 101 and are individually identified by characters at their ends. When this card is in place, the operator looks through the sight opening and then uses a ruler to measure the lines of the image which appear upon the base of the apparatus or the focusing sheet. If the lines are all of the same length, he knows that the apparatus is properly set to make an accurate reproduction of the original but if they vary in length it is then necessary to adjust the rods, the observation element, and the picture holding plate 16 until all lines are of the same length. (Angular adjustment of the rod 13 is made at the swivel joint 14. The picture holder plate 16 turns around the rod 13. This plate should be in proper angular relation to the observation element for accurate reproduction.) The chart will then be removed and when a picture is mounted in front of the plate 16 an absolutely accurate reflection of the same will be seen by the operator and an accurate copy of the same may be made.

Instead of providing a casing having a hood 38 and a slidably mounted precision plate, the casing 59 shown in Figure 6 may be employed. This casing is of the same general shape as the casing 26 but has the forward end of its upper wall reduced in width to form a tongue having its free end rolled to provide a sleeve through which the reduced and threaded end portion of the arm 35 is engaged and in place of the slide plate 40, there has been provided an eyepiece 54 mounted in a ring 55 formed of resilient wire and having a shank 56 extending therefrom and terminating in side arm 57 carrying an eye 58. The eye 58 fits upon the reduced end of the arm against one end of the sleeve of the casing and when a securing nut is applied to the threaded end of the arm and tightened, the casing 59 and eyepiece will be mounted for swinging movement and when adjusted will be frictionally held in a set position. The opening formed in the eyepiece is appreciably smaller than the sight opening 60 formed in the top wall of the casing and when the eyepiece is in position for use will control the angle of visibility to the delineating surface. This eyepiece may be also of the adjustable iris type or in the form of a round disc with openings of various sizes on its outer edge and pivoted in the center on the top of casing 59 with the openings lining up with the sight opening 60 when in a fixed position. When any of the above mentioned types of eyepieces or the slide of Figure 1 is in use, movement of the eye or head while making a copy of an object will not cause the reflection to shift upon the delineating surface and the lines can be accurately followed.

In Figures 8 through 11, there has been illustrated an apparatus of a simplified construction for use by children and amateur artists. The base 61 is formed of sheet metal and at one side has its front and rear portions extended to form tongues 62 and 63 terminating in rolled portions forming sleeves 64 and 65 through which are rotatably engaged arms 66 and 67 projecting transversely from rods 68 and 69 formed of strong wire. At its upper end, the rod 69 carries a clip 70 by means of which a picture is to be held and the upper end portion of the rod 68 is bent transversely to form an arm 71 upon which the observation element 72 is mounted.

This observation element is somewhat similar in construction to that previously described and has a casing 73 which is triangular in shape as shown in Figure 10 and has its open side closed by a glass plate 74 decreased in thickness toward its lower end and constituting a phantom reflector. A mirror 75 is mounted against the rear wall of the casing and the upper wall of the casing is formed with a sight opening 76 through which the operator looks when using the device. At its lower end, the casing is formed with a sleeve 77 which engages about the arm 71 to tiltably mount the casing and this sleeve has frictional gripping engagement with the arm to hold the casing in an angularly adjusted position. It will also be noted that a portion of the sleeve is extended to form a lip 78 which bears against the lower edge portion of the phantom reflector and firmly holds the same against the lower end of the mirror 75.

When this form of apparatus is in use the picture is suspended from the clip 70 in front of the rod 69 and the operator looks through the sight opening 76 and adjusts the rods 68 and 69 and also the observation element until the reflection is properly positioned upon a sheet of paper resting upon the base. This may be a sheet of plain paper or a sheet of graph paper divided into blocks in the usual manner and when a copy is made upon graph paper future enlargements thereof can be made and the blocks of the graph paper used as a guide. Blocks similar to those provided upon graph paper may be marked upon the base in which case they will show through a sheet of thin paper upon which a copy is being made. Enlargements may also be made without first tracing the image on the paper. By looking through the sight opening, the reflection will be seen directly on the dark surface of the base which is divided by coordinates into graph blocks and numbered correspondingly. The image may be transferred in the regular manner to a surface that has correspondingly larger proportionate graph blocks and an enlargement that is beyond the normal scope of the instrument is obtained. The observation element shown in Figure 8 is not provided with an absorption screen and therefore, there has been provided an absorption screen 79 consisting of a sheet of colored celluloid or other semi-transparent material of proper transparency and of sufficient thickness to prevent it from bending downwardly when engaged in jaws at the free end of an arm 80 at the upper end of a clip or bracket 81 formed of resilient wire and engaged about the rod 68. This bracket has rod engaging jaws 82 at its upper and lower ends and these jaws extend about the rod to such an extent that the bracket will be frictionally held in an adjusted position thereon but can be slid longitudinally on the rod and also turned about the same. Therefore, the absorption screen can be disposed at one side of the base when not in use or swung about the rod to a position below the observation element as indicated by dotted lines in Figure 8. As thin wire is used for making the bracket, the arm 80 may be twisted or bent to dispose the screen at a desired angle relative to the observation element and the sheet of paper resting upon the base.

In Figures 12, 13, and 14 there has been illustrated another embodiment of the invention wherein a modified form of observation element is employed. The base 83 is similar to the base 61 except that the graph markings have been omitted, and a plain black surface used instead. Rods 84 and 85 corresponding to the rods 68 and 69 are connected with the base by side arms 86 and 87 rotatably engaged through sleeves 88 and 89 at front and rear ends of the base and the rod 85 carries at its upper end a clip 90 corresponding to the clip 70. The observation element 91 carried by the side arm 92 at the upper end of the rod 84 is formed from a sheet of metal bent intermediate its length to form upper and lower leaves 93 and 94 and these leaves have their facing surfaces polished to provide a mirror on the under face of the leaf 93 and a reflector on the upper face of the leaf 94. The arm 92 extends between the leaves against the bridge 95 as shown in Figure 13 and is secured by a fastener 96 formed of a strand of wire extending transversely of the leaf 93 and having its end portions bent to provide pins 97 which extend through openings formed in the leaves and bear against the arm 92. This is clearly shown in Figure 13 and referring to this figure it will be seen that the observation element will be firmly held upon the arm 92 but can be turned about this arm to adjusted positions where it will be frictionally retained in an adjusted position. A sight opening is formed in the leaf 93 and below this opening, the leaf 94 is formed with a plurality of perforations 99 which are so distributed that when the device is in use, the operator can clearly see the sheet of paper while viewing the reflection of the picture upon the reflector 94. The operation of this embodiment of the invention is the same as previously described. In Figure 8 the rod 69 and in Figure 12 the rod 85 is folded down in a horizontal position away from the operator when making portraits or reproducing landscapes or other animate or inanimate objects that are too large or cannot be secured in the clips 70 and 90.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In an apparatus of the character described, a base, rods having transverse arms at their lower ends journaled in front and rear portions of the base to dispose the rods in transverse spaced relation to the base and mount the rods for vertical swinging movement, rollers carried by said arms to bear upon a sheet of paper and hold the paper flat upon a surface upon which the base and rollers rest, an object holder carried by the rear rod, and an observation element carried by the front rod and mounted for angular adjustment relative to an object carried by the object holder and to a sheet of paper engaged by the rollers.

2. In an apparatus of the character described, a horizontal base, rods pivoted to said base, one forwardly of the other, the rear rod having upper and lower sections pivotally connected with each other whereby the rear rod may be swung vertically as a unit to an adjusted position and its upper section then angularly adjusted relative to its lower section, an object holder carried by the upper section of the rear rod, and an observation element carried by the front rod.

3. In an apparatus of the character described, an observation element consisting of a casing having a top wall formed with a sight opening, a mirror mounted vertically in said casing forwardly of the sight opening, a transparent reflector disposed diagonally in the casing below the sight opening and having its lower end adjacent the lower end of said mirror, and a precision member formed with openings of different sizes and smaller than the sight opening mounted on the casing for shifting movement across the sight opening.

4. A reproducing device comprising a base member, separate brackets pivotally connected to said base member at spaced points thereon for swinging movement toward and away from each other, an optical observation instrument having as one of its elements a camera lucida carried by one of said brackets and an object holder carried by the other of said brackets.

5. A reproducing device comprising a base member, separate brackets pivotally connected to said base member at spaced points thereon for swinging movement toward and away from each other, an optical observation instrument having as one of its elements a camera lucida adjustably carried by one of said brackets and an object holder carried by the other of said brackets.

6. A reproducing device comprising a base member, separate brackets pivotally connected to said base member at spaced points thereon for swinging movement toward and away from each other, an optical observation instrument having as one of its elements a camera lucida adjustably carried by one of said brackets and an object holder adjustably carried by the other of said brackets.

7. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having a wall provided with a sight opening, a mirror supported within said casing angularly with respect to said wall, and a transparent reflector supported by the casing diagonally with respect to the mirror and the wall, said transparent reflector having its lower end adjacent the lower end of the mirror.

8. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing hingedly mounted on said one bracket, said casing having a wall provided with a sight opening, a mirror supported within said casing at substantially right angles to said wall, and a transparent reflector supported by the casing diagonally with respect to the mirror and wall, said transparent reflector having its lower end adjacent the lower end of the mirror.

9. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having a wall hingedly mounted on said one bracket, said wall having a sight opening, a mirror supported within said casing at substantially right angles to said wall, and a transparent reflector supported by the casing diagonally with respect to said wall, said transparent reflector having its lower end adjacent the lower end of the mirror.

10. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having angularly disposed opaque walls, said one bracket having an horizontal arm, means for supporting the casing on said arm for swinging movement about the axis thereof, one of said angularly disposed walls provided with a sight opening, a mirror supported within the casing in laterally spaced relation to the sight opening and parallel to the other wall, and a transparent reflector mounted within the casing and extending diagonally with respect to the mirror and sight opening, said transparent reflector having its lower end adjacent the lower end of the mirror.

11. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having substantially right angularly disposed walls, hinge means extending across one of the walls of said casing for adjustably connecting the casing to said one bracket, one of said walls having a sight opening, a mirror supported within the casing in laterally spaced relation to the sight opening and parallel to the other wall, and a transparent reflector mounted within the casing diagonally with respect to the walls thereof, said transparent reflector having its lower end adjacent the lower end of the mirror.

12. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having a wall provided with a sight opening, a mirror supported within said casing angularly with respect to said wall, a transparent reflector supported by the casing diagonally with respect to the mirror and the wall, and means carried by said casing for cooperation with said sight opening for varying the effective area thereof, said transparent reflector having its lower end adjacent the lower end of the mirror.

13. A reproducing device comprising a base member, separate brackets pivotally connected to said base member at spaced points thereon for swinging movement toward and away from each other, an optical observation element carried by one of said brackets, an object holder carried by the other of said brackets said observation element including a casing having a wall provided with a sight opening, a mirror supported within said casing angularly with respect to said wall, a transparent reflector supported by the casing diagonally with respect to the mirror and the wall, said transparent reflector being longitudinally reduced in thickness from one edge to the other, the thin edge of the reflector being adjacent the lower end of the mirror.

14. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having a wall provided with a sight opening, a mirror supported within said casing angularly with respect to said wall, a transparent reflector supported by the casing diagonally with respect to the mirror and the wall, and an adjustable glare absorbing screen mounted intermediate the reflector and base member, said transparent reflector having its lower end adjacent the lower end of the mirror.

15. A reproducing device comprising a base member, separate brackets pivotally connected to said base member at spaced points thereon for swinging movement toward and away from each other, an optical observation element carried by one of said brackets, an object holder carried by the other of said brackets, said observation element including a casing having a wall provided with a sight opening, a mirror supported within said casing angularly with respect to said wall, a transparent reflector supported by the casing diagonally with respect to the mirror and the wall, and illuminating means adjustably supported on the base member, said transparent reflector having its lower end adjacent the lower end of the mirror.

16. A reproducing device comprising a base member, separate brackets pivotally connected to said base member at spaced points thereon for swinging movement toward and away from each other, an optical observation instrument having as one of its elements a camera lucida carried by one of said brackets, an object holder carried by the other of said brackets, and means carried by said brackets for maintaining in position a delineating surface with respect to the observation instrument and object holder.

17. A reproducing device comprising a base member, separate brackets pivotally connected to said base member at spaced points thereon for swinging movement toward and away from each other, an optical observation instrument having as one of its elements a camera lucida carried by one of said brackets, an object holder carried by the other of said brackets, means carried by said brackets for maintaining in position a delineating surface with respect to the observation instrument and object holder, and illuminating means for said object holder carried by said base member intermediate the brackets.

18. A reproducing device comprising a base member, separate brackets pivotally connected to said base member at spaced points thereon for swinging movement toward and away from each other, an optical observation element carried by one of said brackets, an object holder carried by the other of said brackets, said observation element comprising a plate member of opaque material bent intermediate its ends to provide diverging upper and lower portions, the upper portion having an internal reflecting surface and a sight opening, the lower portion also having an internal reflecting surface and a plurality of openings positioned below said sight opening.

19. In an apparatus of the character described, a base, means on said base supporting an observation element, said observation element consisting of a casing having a top wall formed with a sight opening, a mirror mounted vertically in said casing forwardly of the sight opening, a transparent reflector disposed diagonally in the casing below the sight opening and having its lower end adjacent the lower end of said mirror, said transparent reflector being longitudinally reduced in thickness from one edge to the other, the thin edge being at the apex of the angle formed by the mirror and transparent reflector, an adjustable glare-absorbing screen, means supporting said screen intermediate the observation element and the base, and illuminating means adjustably supported on the base.

MORRIS KAPLOWITZ.